Dec. 26, 1922.
A. OLSON.
IRRIGATING DEVICE FOR FLOWER BEDS.
FILED AUG. 25, 1922.
1,439,973.
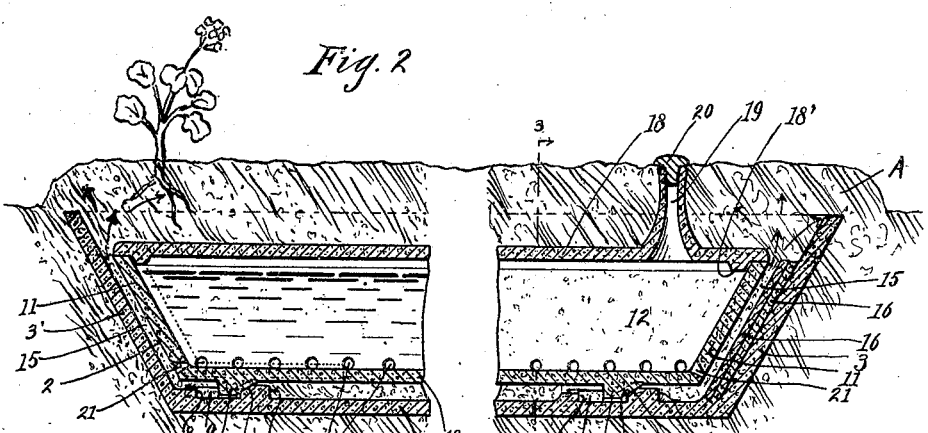
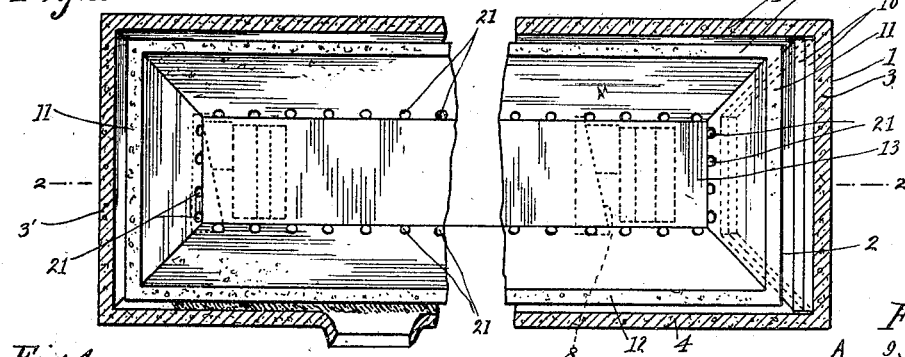
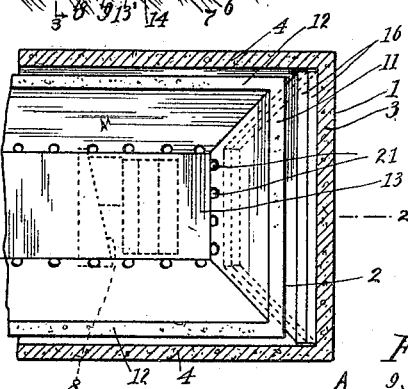
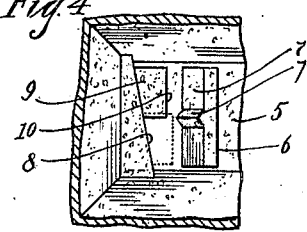
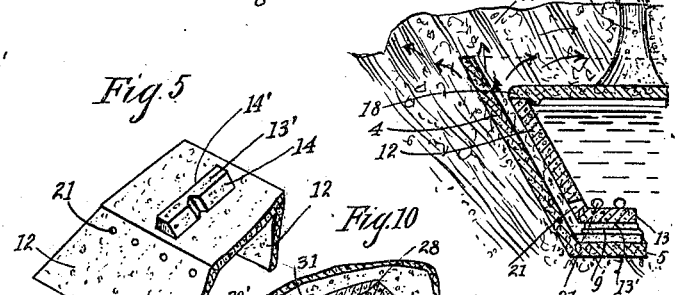
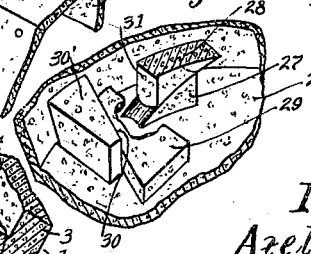
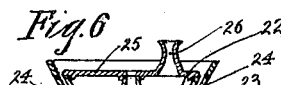
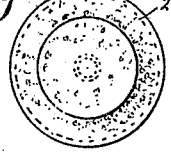
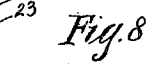
Inventor,
Axel Olson
by A. S. Johnson
Attorney Patented Dec. 26, 1922.

1,439,973

UNITED STATES PATENT OFFICE.

AXEL OLSON, OF ST. PAUL, MINNESOTA.

IRRIGATING DEVICE FOR FLOWER BEDS.

Application filed August 25, 1922. Serial No. 584,248.

*To all whom it may concern:*

Be it known that I, AXEL OLSON, a subject of the King of Sweden, residing at St. Paul, in the county of Ramsey and State of Minnesota, have invented certain new and useful Improvements in Irrigating Devices for Flower Beds, of which the following is a specification.

This invention relates to irrigating devices for flower beds, and has for its principal object, to provide water storing and distributing devices which are practically concealed from view by being wholly buried in the ground, but are accessible from above for the purpose of refilling, and constructed in a manner to present selectively a definite area of water saturated soil, to the underside of the volume of earth constituting the flower bed, whereby the water of said saturated soil is caused to permeate the earth by capillary attraction or evaporation, said devices also including in their construction certain novel features of adjustment, whereby said wet area may be increased or diminished, as may be found necessary by the nature of the soil.

A further object of the invention, is to provide an improved irrigating device of the class described, which is simple in construction, and designed to be made wholly of cement, or of non-corrosive material, such as copper and zink, to render it durable and indestructible, and which has no parts which are required to move or shift in its operation.

A still further object of the invention, is to provide a device of the class described, which is constructed with a view to avoiding fracture of parts by freezing during winter, this being obviated by inclining the walls of the reservoir and receptacle in a manner to prevent direct side pressure on the walls of these vessels.

Other objects of the invention will be pointed out as this specification progresses; the invention consisting in the construction, combination, and arrangement of parts hereinafter described and specifically claimed.

In the drawings forming part of this specification:

Figure 1, is a plan view of a reservoir and an outer receptacle, partly broken away, embodying the invention, with the exception of the cover, which is not here shown.

Figure 2, is a sectional view on line 2—2 of Figure 1.

Figure 3, is a sectional view on line 3—3 of Figure 2.

Figure 4, is a view looking into one end of the receptacle, showing part of the adjustment devices for holding the reservoir at different levels.

Figure 5, is a fragmentary perspective view of one end of the underside of the reservoir.

Figure 6, is a vertical sectional view on a central line, of a circular irrigating device embodying my invention.

Figure 7, is a plan view of the underside thereof.

Figure 8, is a fragmentary perspective view of the underside of the circular receptacle thereof.

Figure 9, is a fragmentary plan view of the floor of the outer receptacle.

Figure 10, is a fragmentary perspective view, drawn to an enlarged scale, of the adjustment devices for the circular irrigating devices; and Figure 11, is a fragmentary perspective view showing a detail in the floor structure of the receptacle.

The invention comprises an outer receptacle or earth container 1, having outwardly inclined surrounding walls, and an inner water container or reservoir 2, having outwardly inclined surrounding walls, which latter are parallel with the walls of the receptacle.

The receptacle comprises end walls 3 and 3', and side walls 4—4, and a bottom 5, the earth container being long and narrow, and having on its floor, preferably near each end thereof, and extending transversely at right angles to said side walls, a lug 6, each lug having an inclined upper side 7, which inclines toward the end wall 3, and a preferably V shaped rib 7' extending longitudinally of the receptacle, on said inclined side. Adjacent the inclined side of each of said lugs and spaced therefrom, is a shoulder 8, extending upwardly from the floor 5, and directed diagonally across the latter. Slidingly engaging with said shoulder with one of its sides, is the wedge 9 (one for each of said lugs), formed opposite said side with a working face 10, which extends at rgiht angles to the longitudinal axis of the receptacle and parallel with the lug 6.

The reservoir comprises end walls 11—11 and side walls 12—12, which walls are parallel, respectively, with the walls of the receptacle, as hereinbefore stated, and a floor 13, parallel with the floor 5 of the receptacle and spaced therefrom, and having a transversely disposed lug 13′ on its under side, at each end thereof, said lugs being positioned to coact with the lugs 6 to slidingly support the reservoir in parallelism with the receptacle 1.

The lugs 13′ are formed with inclined sides 14, which latter engage, respectively, with the inclined sides 7 of the lugs 6, so that when the reservoir is caused to be moved lengthwise, it will be simultaneously raised and maintained in parallelism with the receptacle.

For the purpose of holding the reservoir positioned at the desired level, the aforesaid wedges 9 are provided, the sides 10 thereof engaging, respectively, with the sides 14′ of the lugs 13′. Obviously, the reservoir may thus be raised or lowered and so held at any chosen level with respect to the receptacle 1, as the wedges 9 may be slid, respectively, along the shoulders 8 until they engage with the lugs 13′.

It is also obvious, that a change of level of the reservoir will correspondingly change the width of the space 15, which separates the surrounding walls of the receptacle and reservoir, said space always retaining a uniform width between the side walls 4 and 12, and the end walls 3′ and 11.

The end wall 3, of the receptacle, is spaced farther from the reservoir to permit the insertion of a plurality of superposed, substantially similar, filling plates 16. These filling plates are preferably of uniform thickness and completely cover the inside of the end wall 3, and removably fit against the side walls of the receptacle, the lower edges of said plates resting in the grooves 17 in the floor 5 of the receptacle, which latter extend parallel with the end wall for the full width thereof. These plates serve to displace the volume of water which would fill the space which they occupy.

Normally, with the plates in position, the space 15 is of uniform width, applicant having found by experiment that half an inch is most suitable.

To widen the space, for a purpose to be hereinafter described, the reservoir will be required to be slid on the inclination of the lugs 6, as hereinbefore explained, and the wedges 9 positioned accordingly. This operation, however, will render the space between the end walls 11 and 3 narrower than elsewhere, thereby disturbing the uniformity of the head of water contacting with the soil of the flower bed. In order to compensate for the reduction in width of said space, one of the plates 16 is removed, so that the space will be approximately as wide as the rest. When conditions warrant, the second plate 16 may be removed.

The reservoir is provided with a preferably flat cover 18, formed on its under side with a surrounding bead 18′, to thereby keep the cover properly positioned. Preferably, at one end of the reservoir is the inlet stand pipe 19, fitted with a closure stopper 20, said pipe communicating with the interior of the reservoir, whereby water is conducted into the reservoir.

The inlet pipe extends to the top of the soil (which latter is designated by the letter A), as indicated in Figure 2, designating a grave, elevated slightly from the surrounding ground, as is customary, one of the objects of the invention being the provision of irrigating means whereby plants may be maintained in good condition for reasonable periods of time between visits to the cemetery. The invention, however, may be used for ordinary flower beds on level ground.

Piercing the surrounding walls of the reservoir, preferably on the level of the floor, are the water outlets 21, through which the water flows into the receptacle below. The water will obviously rise to its own level in the space 15.

The walls 3, 3′, and 4 of the receptacle, as shown, extend beyond the top of the cover an appreciable distance, to approximately the ground line above which the soil A extends to make the mound constituting a grave. This extension of the surrounding walls of the receptacle serves to prevent the moisture from being dissipated to the soil surrounding the receptacle, and forms a body of moistened soil covering the lid into which the roots of the plants extend.

In operation, the receptacle, which also may be termed a soil and water container, is buried, as indicated in Figures 2 and 3. The reservoir is then placed in position, as hereinbefore described, the proper level thereof having been previously ascertained by experiment to secure the proper width of the surrounding space 15, which may also be termed the head of the water saturated soil. The cover is then placed in position. Soil is now packed closely around the cover, and tamped into the surrounding space 15, the soil having been previously placed on the floor of the receptacle to fill the space under the reservoir. The flower bed is then built up to the level of the stopper 20, or slightly higher to just cover same, if desired, it being a simple matter to find same after becoming familiar with the location.

The reservoir is now filled with water through the intake pipe 19. The soil in the space 15, surrounding the reservoir, is constantly saturated with water to the consistency of soft mud. As the water reduces in volume, the head of the mud between the walls falls accordingly, but is not reduced in area, and continues to function to conduct water by capillary action to the flower bed above, until the water in the floor of the receptacle is exhausted.

Applicant has found that the width of the space 15, or, in other words, the area of the head of the mud, determines, to a close approximation, the length of time required for exhausting the water supply in the reservoir, he having found that a difference of one-eighth of an inch, more or less, in the width of said space, will make a difference of several days in the time required for the evaporation of the water. Further, he has found that the nature of the soil, in some localities, requires wider spaces than others, where the soil is clayey and hard. Thus, in installing my improved irrigating device, the area of the opening surrounding the top of the soil and water container is adjusted with due regard to the nature of the soil present, some soils requiring an inch space to keep the flower bed in good condition, while in others but half an inch is required to secure satisfactory results.

In Figures 6, 7, 8, and 9, I have shown a circular irrigating device embodying my invention, said device comprising a circular reservoir 22, having an outwardly inclined surrounding wall, a circular receptacle 23, having a circular surrounding wall parallel with the wall of the reservoir to form the space 24 of uniform width therebetween; a cover 25, for the reservoir, said cover having an inlet pipe 26, and an arrangement of inclined lugs and fastening wedges, which may be briefly described as follows:

Corresponding to the lugs 6 of the device described in the foregoing, are the lugs 27, which in turn engage with the lugs 28 on the under side of the reservoir 22, as indicated in Figure 10. The faces of the lugs 27 and 28 are, respectively, channeled and rounded to slidingly interfit to keep the reservoir 22, from becoming dislodged, and correspond to the rib 7', which slides in the notch 7'' of the lug 13' to keep the reservoir 2 longitudinally central of the receptacle. Thus, by a rotary movement of the reservoir, the latter will be simultaneously raised bodily. For the purpose of holding the reservoir raised to the desired position, the wedge 29 is provided, said wedge engaging with the side 30 of the lug 30', and with the face 31 of the lug 28, the side 30 being inclined toward the lugs 28 and 30' with respect to the center of the receptacle 23.

Centrally, the reservoir 22 is provided with a vertical open top hollow column 32, the cover 25 having a central opening to register with the open top of said column, so that the water mingled with earth will rise in said column to the soil above. By the use of the circular irrigating device, small, round flower beds may be kept moist for periods of a week or more, the device being buried in the same manner as the device first described.

I claim:

1. In a device of the class described, comprising in combination, an open top receptacle for holding soil and water in commingling state, a water container supported in said receptacle in a manner to be spaced from the bottom thereof, the outside of the surrounding walls of said container being parallel with the inside of the surrounding walls of said receptacle and uniformly spaced therefrom, a cover for said container, a closable inlet pipe for said container extending through and an appreciable distance beyond the top of said cover, and a plurality of spaced outlet openings perforating the surrounding walls of said container at a point adjacent the floor thereof to admit water to said receptacle to commingle with the soil therein.

2. In a device of the class described, comprising in combination, a closed reservoir having a closable water inlet pipe for filling the reservoir extending an appreciable distance upward beyond the top thereof, spaced perforations in the walls of said reservoir to drain the contents thereof, and a water and earth container designed to receive said reservoir, the inside of the walls of said container being parallel with the outside of the walls of said reservoir and spaced therefrom.

3. An irrigating device for flower beds, comprising in combination, a closed reservoir having surrounding walls inclined outwardly, and an inlet pipe leading from the interior thereof to a point above the top thereof, whereby to conduct water to the reservoir, spaced discharge openings in the walls of the reservoir to drain the contents thereof, a receptacle adapted to hold water, containing said reservoir, and having surrounding walls parallel with the walls of said reservoir and spaced therefrom, coacting inclines between said receptacle and reservoir for slidingly supporting the latter in a manner to effect a raising thereof when slid, and retaining means for holding the reservoir in the position to which it is slid.

4. An irrigating device for flower beds, comprising in combination, a closed reservoir having discharge openings in its sides to discharge its contents, a water container containing said receptacle and extending to the top thereof, the surrounding walls of said container and reservoir inclining spacedly outwardly in parallelism, inclines formed on the bottom of said receptacle within the latter, inclines formed on the under side of said reservoir engaging with said first named inclines and coacting therewith to bodily raise said reservoir in parallelism with said receptacle when said reservoir is slid, a shoulder extending diagonally across the bottom of said receptacle, and a wedge in engagement with said shoulder and said second named inclines, for the purpose set forth.

5. An irrigating device for flower beds, comprising in combination, a receptacle adapted to contain earth and water in commingling state and to be buried below the surface of the ground, a closed reservoir seated within said receptacle in a manner to form a space of uniform width entirely around said reservoir, said space adapted to contain earth and water in commingling state and being in open communication with the volume of earth constituting the flower bed, and discharge openings perforating the walls of said reservoir for discharging the water into said receptacle.

6. An irrigating device for flower beds, comprising in combination, an elongated closed reservoir having outwardly inclined side and end walls, and an inlet pipe extending from the top thereof, a receptacle containing said reservoir and having walls inclined in parallelism with said reservoir walls and extending to the top thereof, and normally spaced uniformly therefrom at said side walls and one of said end walls, and discharge openings in said reservoir for discharging the contents thereof into said receptacle, supporting means in connection with said receptacle and reservoir for supporting said reservoir in a manner to enable it to be slid endwise in said receptacle and be raised in parallelism simultaneously therewith, said means including coacting inclines carried by said reservoir and receptacle, and a filling plate removably fitted against the inside of the other of said end walls of said receptacle and spaced from said reservoir, for the purpose set forth.

7. An irrigating device for flower beds, comprising in combination, a closed reservoir having surrounding walls inclined outwardly, and an inlet pipe leading from the interior thereof to a point above the top thereof, whereby to conduct water to the reservoir, spaced discharge openings in the walls of the reservoir to drain the contents thereof, a receptacle containing said reservoir and having surrounding walls parallel with the walls of said reservoir and spaced therefrom, coacting inclines between said receptacle and reservoir for slidingly supporting the latter in a manner to effect a raising thereof when slid, and means for slidably holding said reservoir longitudinally central of said receptacle.

In testimony whereof I affix my signature.

AXEL OLSON.